(12) United States Patent
Yuan et al.

(10) Patent No.: US 12,711,178 B2
(45) Date of Patent: Aug. 18, 2026

(54) METHODS, APPARATUSES, AND SYSTEMS FOR MANAGING GRAPH METADATA IN DISTRIBUTED GRAPH DATABASE

(71) Applicant: Alipay (Hangzhou) Information Technology Co., Ltd., Hangzhou (CN)

(72) Inventors: Xiaohua Yuan, Hangzhou (CN); Meng Zhou, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 19/212,951

(22) Filed: May 20, 2025

(65) Prior Publication Data

US 2025/0355942 A1 Nov. 20, 2025

(30) Foreign Application Priority Data

May 20, 2024 (CN) ......................... 202410626919.5

(51) Int. Cl.
*G06F 16/901* (2019.01)
*G06F 16/21* (2019.01)

(52) U.S. Cl.
CPC ........ *G06F 16/9024* (2019.01); *G06F 16/219* (2019.01)

(58) Field of Classification Search
CPC ........................... G06F 16/9024; G06F 16/219
See application file for complete search history.

(56) References Cited

U.S. PATENT DOCUMENTS 8,788,465 B2 * 7/2014 Fontenot ............. G06F 11/1425 707/687
10,459,647 B1 * 10/2019 Lazier ..................... G06F 3/064
11,880,557 B2 * 1/2024 Tilikin ................ G06F 3/04847
12,379,865 B2 * 8/2025 Guttapalem .......... G06F 3/0607
2017/0364534 A1 * 12/2017 Zhang .................. G06F 16/284
(Continued)

FOREIGN PATENT DOCUMENTS

CN 111666159 A 9/2020

OTHER PUBLICATIONS

Matt Fisher et al., "Creating a metadata graph structure for in-memory optimization", Jul. 13, 2023, pp. 1-17 (Year: 2023).*
(Continued)

*Primary Examiner* — Jared M Bibbee
(74) *Attorney, Agent, or Firm* — Fish & Richardson P.C.

(57) ABSTRACT

Storage service version configuration data is obtained at a time when a data storage node cluster starts a data storage service based on a debugging mode. Based on the storage service version configuration data and data storage node cluster topology information, graph metadata of the distributed graph database is created at a time when no data storage service is provided, where the graph metadata includes a storage service version configuration field populated with the storage service version configuration data and a node metadata field of each data storage node. Node metadata information of the data storage node is obtained at a time when the data storage node cluster starts the data storage service based on a normal mode. The obtained node metadata information of the data storage node is filed into a corresponding node metadata field of the graph metadata to obtain managed graph metadata.

20 Claims, 7 Drawing Sheets

Distributed graph database system 100

API interface layer 110

Engine analysis layer 120

Graph data storage layer 130

Data storage node 130-1

Data storage node 130-2

...

Data storage node 130-n

(56) References Cited

U.S. PATENT DOCUMENTS

| | | | | |
|---|---|---|---|---|
| 2018/0024869 | A1* | 1/2018 | John | G06F 9/5066 718/105 |
| 2020/0201910 | A1* | 6/2020 | Gavaudan | G06Q 20/32 |
| 2022/0067011 | A1* | 3/2022 | Yue | G06F 16/248 |
| 2022/0067047 | A1* | 3/2022 | Wang | G06F 16/2322 |
| 2022/0335068 | A1* | 10/2022 | Yue | G06F 16/285 |
| 2024/0296145 | A1* | 9/2024 | Gandhi | G06F 16/156 |

OTHER PUBLICATIONS

Dong Dai et al., “Managing Rich Metadata in High-Performance Computing Systems Using a Graph Model”, IEEE, Dec. 17, 2018, pp. 1-15 (Year: 2018).* docs.arangodb.com [online], “ArangoDB—Features and Capabilities,” available on or before Dec. 10, 2023, via Internet Archive: Wayback Machine URL<https://web.archive.org/web/20231210005252/https://docs.arangodb.com/3.10/about-arangodb/features/>, retrieved on Oct. 15, 2025, retrieved from URL<https://docs.arangodb.com/3.10/about-arangodb/features/>, 4 pages.

docs.arangodb.com [online], “ArangoDB—HTTP interface for clusters,” available on or before Feb. 9, 2025, via Internet Archive: Wayback Machine URL<https://web.archive.org/web/20250209051941/https://docs.arangodb.com/3.10/develop/http-api/cluster/>, retrieved on Oct. 15, 2025, retrieved from URL<https://docs.arangodb.com/3.10/develop/http-api/cluster/>, 13 pages.

Extended European Search Report in European Appln. No. 25174643.4, mailed on Oct. 16, 2025, 12 pages.

raw.githubusercontent.com [online], “v3.10.14,” Apr. 1, 2024, retrieved on Oct. 15, 2025, retrieved from URL<https://raw.githubusercontent.com/arangodb/arangodb/3.10/CHANGELOG>, 362 pages

* cited by examiner

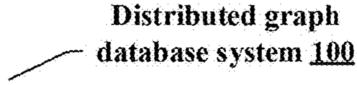
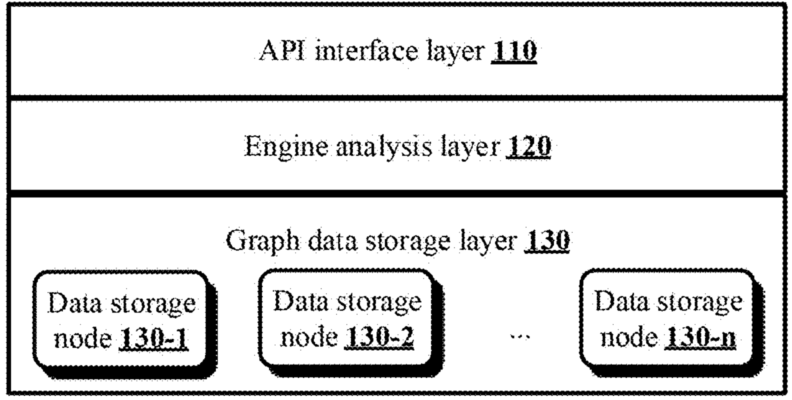
FIG. 1
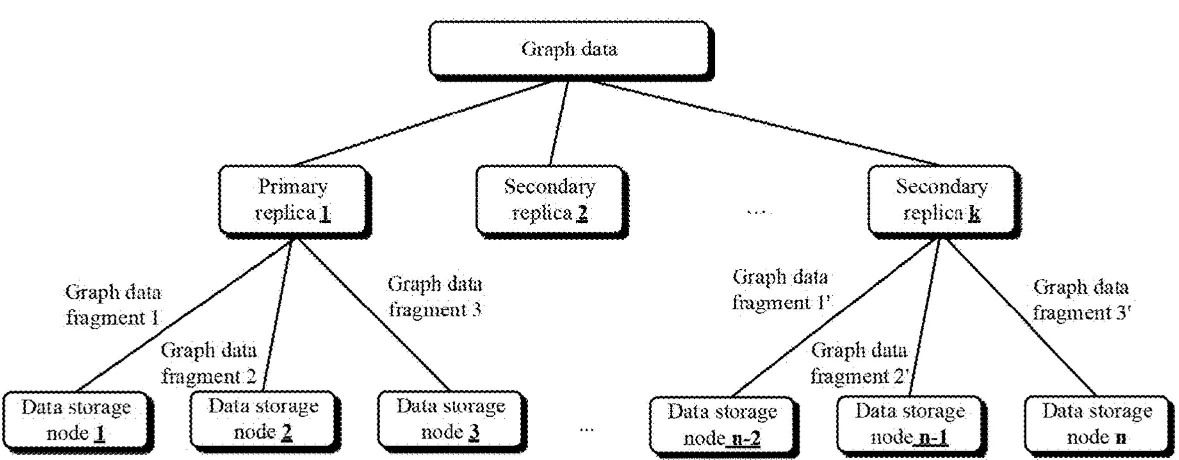
FIG. 2

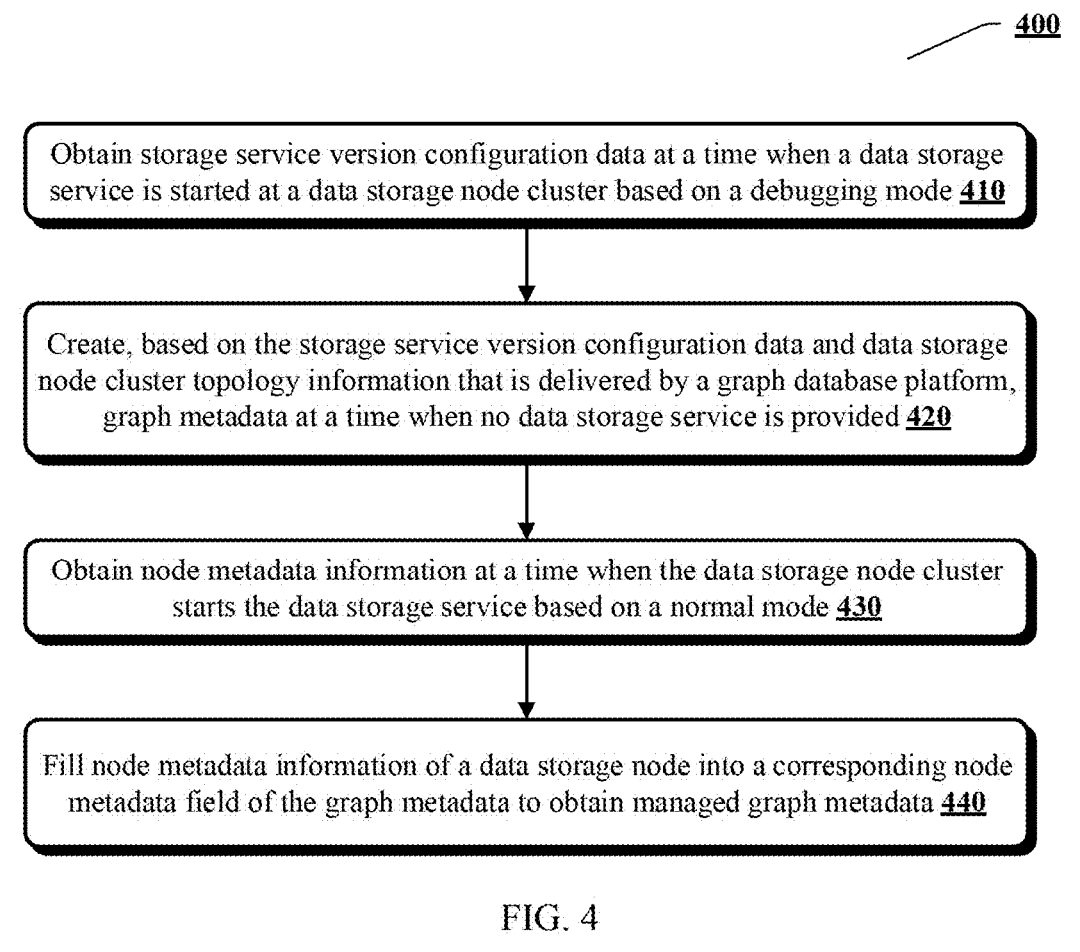

400

Obtain storage service version configuration data at a time when a data storage service is started at a data storage node cluster based on a debugging mode 410

Create, based on the storage service version configuration data and data storage node cluster topology information that is delivered by a graph database platform, graph metadata at a time when no data storage service is provided 420

Obtain node metadata information at a time when the data storage node cluster starts the data storage service based on a normal mode 430

Fill node metadata information of a data storage node into a corresponding node metadata field of the graph metadata to obtain managed graph metadata 440

FIG. 4

```
{
  "project": "example",
  "replicas": [
    {
      "description": "",
      "election_priority": 0,
      "flow": 0,
      "hosts_info": [
        {
          "geabase_version": "4.2.6-6405",
          "host": "1:10",
          "status": ""
          }
        ],
        "primary": ,
        "replica_id": ,
      },
      {
        "geabase_version": "5.2.6-6405",
        "host": "2:10",
        "status": ""
          }
        ],
        "primary": ,
        "replica_id": ,
      },
      {
        "geabase_version": "6.2.6-6407",
        "host": "3:10",
        "status": ""
      }
        ],

        "primary": ,
        "replica_id": ,
      }
  ]
}
```

FIG. 5

```
{
  "project": "example",
  "replicas": [
    {
      "description": "",
      "election_priority": 0,
      "flow": 0,
      "hosts_info": [
        {
          "geabase_version": "4.2.6-6405",
          "host": "1:10",
          "status": "GBS_ACTIVE"
          }
        ],
        "primary": true,
        "replica_id": 1,
      },
      {
        "geabase_version": "5.2.6-6405",
        "host": "2:10",
        "status": "GBS_ACTIVE"
          }
        ],
        "primary": false,
        "replica_id": 2,
      },
      {
        "geabase_version": "6.2.6-6405",
        "host": "3:10",
        "status": "GBS_ACTIVE"
      }
        ],

        "primary": false,
        "replica_id": 3,
    }
  ]
}
```

FIG. 6

METHODS, APPARATUSES, AND SYSTEMS FOR MANAGING GRAPH METADATA IN DISTRIBUTED GRAPH DATABASE

CROSS-REFERENCE TO RELATED APPLICATIONS

This application claims priority to Chinese Patent Application No. 202410626919.5, filed on May 20, 2024, which is hereby incorporated by reference in its entirety.

TECHNICAL FIELD

Embodiments of this specification generally relate to the field of graph databases, and in particular, to methods, apparatuses, and systems for managing graph metadata in a distributed graph database.

BACKGROUND

A graph database is a database that stores data in a graph structure and is suitable for processing data in a complex relationship. In querying the data in a complex relationship, the graph database has higher performance and flexibility than a relational database. With the continuous development of graph computing technologies, the graph database is increasingly applied to various application scenarios, such as an Internet application scenario.

Graph data is composed of nodes and edges, where the nodes represent entities and the edges represent relationships between the entities. For example, in social graph data, each person represents one node, and relationships (for example, friends, families, or colleagues) form edges. As increasingly more entities and relationships are involved in an application scenario, a scale of graph data becomes increasingly larger, and a single data storage node (for example, a server node) cannot provide an enough storage capacity to store complete graph data. Therefore, a distributed graph database is proposed.

The distributed graph database is a graph database that stores, manages, and processes graph data on a plurality of data storage nodes. Based on a distributed system theory, the distributed graph database segments graph data into a plurality of graph data fragments, and the graph data fragments are separately stored on different data storage nodes. Then, graph data are combined in a distributed computing manner to form complete graph data, so as to provide a graph data service.

When a distributed graph database is deployed on a graph database platform, an engine analysis node cluster of the distributed graph database is first deployed, and then a data storage node cluster of the distributed graph database is deployed. For each data storage node in the data storage node cluster, data storage services of a same version may be deployed, or data storage services of different versions may be deployed. Data storage services of different versions can provide different data storage service function sets. For example, a data storage service of version 1.0 can support data storage function 1 and data storage function 2, a data storage service of version 1.5 can support data storage function 1 and data storage function 3, and a data storage service of version 2.0 can support data storage function 4 and data storage function 5.

During a graph database service, graph metadata of the distributed graph database needs to be managed by an engine analysis service deployed at the engine analysis node cluster. Graph metadata managed by the engine analysis service includes version information of a data storage service supported by the distributed graph database and node metadata information at each data storage node. The node metadata information at the data storage node can include, for example, node graph topology information and node status information. Generally, the distributed graph database supports many data storage service versions, and during actual deployment of the distributed graph database, the data storage node may implement only some data storage service versions. In this case, if the engine analysis service still maintains and manages all the data storage service versions supported by the distributed graph database, management load of the engine analysis service is large. Consequently, graph metadata management costs are increased, and graph metadata management efficiency is reduced.

SUMMARY

Embodiments of this specification provide methods, apparatuses, and systems for managing graph metadata in a distributed graph database. According to the method for managing graph metadata, a data storage service can be started in a debugging mode to obtain actual data storage service version configuration data used by a distributed graph database, and graph metadata at a time when no data storage service is provided based on the obtained actual data storage service version configuration data and data storage node cluster topology information. Subsequently, the data storage service is started based on a normal mode to obtain node metadata of a data storage node at a time when the data storage service is provided, and a corresponding node metadata field of the created graph metadata is updated by using the obtained node metadata. In this way, graph metadata managed by an engine analysis node cluster maintains only a data storage service version actually supported during current deployment of the distributed graph database, and does not need to maintain all data storage service versions that can be supported by the distributed graph database. Therefore, management load of an engine analysis service is reduced, and further, graph metadata management costs are reduced, and graph metadata management efficiency is improved.

According to one aspect of the embodiments of this specification, a method for managing graph metadata in a distributed graph database is provided, including: obtaining storage service version configuration data at a time when a data storage node cluster starts a data storage service based on a debugging mode; creating, based on the storage service version configuration data and data storage node cluster topology information that is delivered by a graph database platform, graph metadata of the distributed graph database at a time when no data storage service is provided, where the graph metadata includes a storage service version configuration field and a node metadata field of each data storage node, and the storage service version configuration field is populated with the storage service version configuration data; obtaining node metadata information of the data storage node at a time when the data storage node cluster starts the data storage service based on a normal mode; and filling the obtained node metadata information of the data storage node into a corresponding node metadata field of the graph metadata to obtain managed graph metadata.

Optionally, in an example of the above-mentioned aspect, the storage service version configuration data includes storage service version information.

Optionally, in an example of the above-mentioned aspect, the data storage service is started in a manner of a container instance.

Optionally, in an example of the above-mentioned aspect, debugging-mode-based data storage services of data storage nodes in the data storage node cluster are started synchronously.

Optionally, in an example of the above-mentioned aspect, normal-mode-based data storage services of the data storage node cluster are started after debugging-mode-based data storage services are turned off.

Optionally, in an example of the above-mentioned aspect, the node metadata information at a time when the data storage service is started based on the normal mode is reported to an engine analysis node cluster through the data storage node cluster by using a heartbeat mechanism.

Optionally, in an example of the above-mentioned aspect, the storage service version configuration data is obtained from the data storage node cluster through the graph database platform, and is then written into an engine analysis node cluster.

According to another aspect of the embodiments of this specification, a method for managing graph metadata in a distributed graph database is provided, including: completing deployment of the distributed graph database through a graph database platform, and delivering data storage node cluster topology information to an engine analysis node cluster; starting an engine analysis service of the engine analysis node cluster through the engine analysis node cluster; starting a data storage service of a data storage node cluster based on a debugging mode through the graph database platform; obtaining, through the engine analysis service, storage service version configuration data at a time when the data storage node cluster starts the data storage service based on a debugging mode, and creating, based on the data storage node cluster topology information and the storage service version configuration data, graph metadata of the distributed graph database at a time when no data storage service is provided, where the graph metadata includes a storage service version configuration field and a node metadata field of each data storage node, and the storage service version configuration field is populated with the storage service version configuration data; turning off a debugging-mode-based data storage service of the data storage node cluster through the graph database platform, and starting a normal-mode-based data storage service; and obtaining, through the engine analysis service, node metadata information of the data storage node at a time when the data storage node cluster starts the data storage service based on a normal mode, and filling the node metadata information into a corresponding node metadata field of the graph metadata to obtain managed graph metadata.

According to another aspect of the embodiments of this specification, an apparatus for managing graph metadata in a distributed graph database is provided, including: a storage service version configuration data acquisition unit, configured to obtain storage service version configuration data at a time when a data storage node cluster starts a data storage service based on a debugging mode; a graph metadata creation unit, configured to create, based on the storage service version configuration data and data storage node cluster topology information that is delivered by a graph database platform, graph metadata of the distributed graph database at a time when no data storage service is provided, where the graph metadata includes a storage service version configuration field and a node metadata field of each data storage node, and the storage service version configuration field is populated with the storage service version configuration data; a node metadata information acquisition unit, configured to obtain node metadata information of the data storage node at a time when the data storage node cluster starts the data storage service based on a normal mode; and a graph metadata generation unit, configured to fill the obtained node metadata information of the data storage node into a corresponding node metadata field of the graph metadata to obtain managed graph metadata.

Optionally, in an example of the above-mentioned aspect, the apparatus may further include: an engine analysis service starting unit, configured to start an engine analysis service of an engine analysis node cluster after the graph database platform completes deployment of the distributed graph database and delivers data storage node cluster topology information to the engine analysis node cluster.

According to another aspect of the embodiments of this specification, a system for managing graph metadata in a distributed graph database is provided, including a graph database platform, an engine analysis node cluster, and a data storage node cluster. After deployment of the distributed graph database is completed on the graph database platform and data storage node cluster topology information is delivered to the engine analysis node cluster, the engine analysis node cluster starts an engine analysis service of the engine analysis node cluster, and the graph database platform starts a data storage service of the data storage node cluster based on a debugging mode; the engine analysis node cluster obtains, through the engine analysis service, storage service version configuration data at a time when the data storage node cluster starts the data storage service based on the debugging mode, and creates, based on the data storage node cluster topology information and the storage service version configuration data, graph metadata of the distributed graph database at a time when no data storage service is provided, where the graph metadata includes a storage service version configuration field and a node metadata field of each data storage node, and the storage service version configuration field is populated with the storage service version configuration data; the graph database platform turns off a debugging-mode-based data storage service of the data storage node cluster, and starts a normal-mode-based data storage service; and the engine analysis node cluster obtains, through the engine analysis service, node metadata information of the data storage node at a time when the data storage node cluster starts the data storage service based on a normal mode, and fills the node metadata information into a corresponding node metadata field of the graph metadata to obtain managed graph metadata.

According to another aspect of the embodiments of this specification, an apparatus for managing graph metadata in a distributed graph database is provided, and includes the following: at least one processor; a storage coupled to the at least one processor; and a computer program stored in the storage. The at least one processor executes the computer program to implement the above-mentioned method for managing graph metadata in a distributed graph database.

According to another aspect of the embodiments of this specification, a computer-readable storage medium is provided, where the computer-readable storage medium stores an executable instruction, and when being executed, the instruction enables a processor to perform the above-mentioned method for managing graph metadata in a distributed graph database.

According to another aspect of the embodiments of this specification, a computer program product is provided, including a computer program, where the computer program is executed by a processor to implement the above-mentioned method for managing graph metadata in a distributed graph database.

BRIEF DESCRIPTION OF DRAWINGS

The essence and advantages of the content of this specification can be further understood by referring to the following accompanying drawings. In the accompanying drawings, similar components or features can have the same reference numerals.

FIG. 1 is an example schematic diagram illustrating a distributed graph database system;

FIG. 2 is an example schematic diagram illustrating a graph storage topology structure of graph data;

FIG. 4 is an example flowchart illustrating a method for managing graph metadata in a distributed graph database, according to embodiments of this specification;

FIG. 5 is an example schematic diagram illustrating graph metadata at a time when no data storage service is provided, according to embodiments of this specification;

FIG. 6 is an example schematic diagram illustrating graph metadata at a time when a storage service is provided, according to embodiments of this specification;

DETAILED DESCRIPTION

Figure 3:
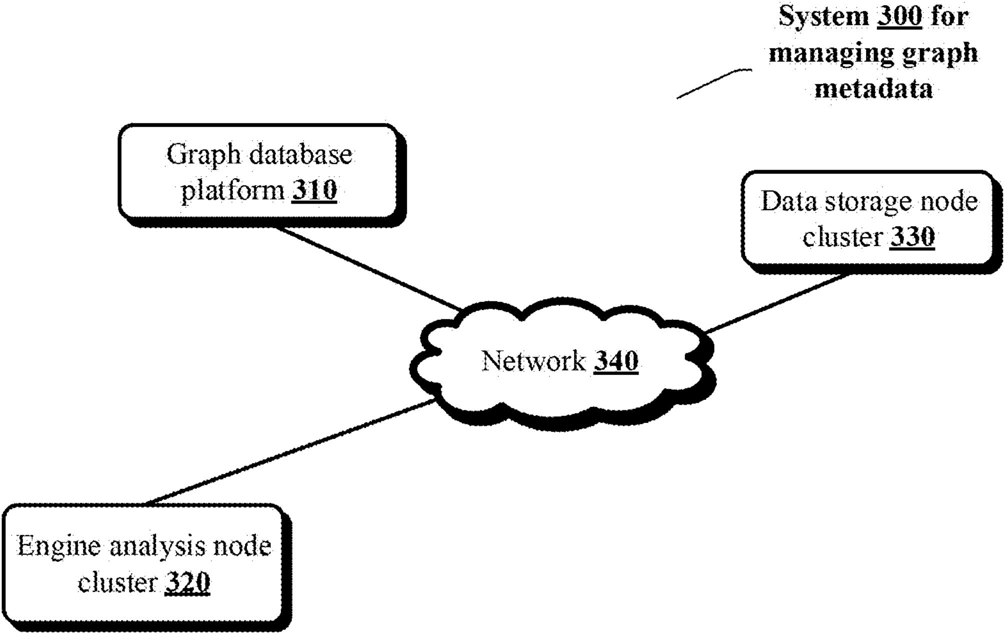
FIG. 3 is an example diagram illustrating an architecture of a system for managing graph metadata in a distributed graph database, according to embodiments of this specification.

The subject matters described in this specification are discussed below with reference to example implementations. It should be understood that the discussion of these implementations is merely intended to enable a person skilled in the art to better understand the subject matters described in this specification, and is not intended to limit the protection scope, applicability, or examples described in the claims. The functions and arrangements of the elements under discussion can be changed without departing from the protection scope of this specification. Various processes or components can be omitted, replaced, or added in various examples as needed. For example, the described method can be performed in a sequence different from the described sequence, and the steps can be added, omitted, or combined. In addition, the features described in some examples can also be combined in other examples.

As used in this specification, the term "include" and variants thereof represent an open term, which means "including but not limited to". The term "based on" represents "at least partially based on". The terms "one embodiment" and "one or more embodiments" represent "at least one embodiment". The term "another embodiment" represents "at least one other embodiment". The terms "first", "second", etc. can refer to different or identical objects. Other definitions, whether explicit or implicit, can be included below. Unless expressly specified in the context, the definition of a term is consistent throughout this specification.

A flowchart used in this specification illustrates operations implemented by a system according to some embodiments of this specification. It should be clearly understood that operations in the flowchart may not be implemented in sequence. In contrast, the operations can be implemented in reverse order or simultaneously. In addition, one or more other operations can be added to the flowchart. One or more operations can be removed from the flowchart.

FIG. 1 is an example schematic diagram illustrating an architecture of a distributed graph database system 100.

As shown in FIG. 1, the distributed graph database system 100 includes an API interface layer 110, an engine analysis layer 120, and a graph data storage layer 130. The API interface layer 110 is configured to implement interaction with the outside of the graph database system, for example, receive a graph data processing request of a client device on which an upstream/downstream application of a graph database is installed, for example, a graph data read/write request or a replica expansion request. In addition, the API interface layer 110 can further perform other operations on the graph database, such as whitescreen of a graph database function, parameter security check, graph database function combination, or a graph database visualization operation.

The engine analysis layer 120 is configured to implement metadata management of stored graph data, for example, metadata generation, storage, and update. Metadata of the stored graph data includes, for example, replica topology information of the graph data. For example, the replica topology information can include: a quantity of replicas the graph data is copied into, a node cluster on which each replica is stored, data storage node distribution information of each node cluster (that is, which data storage nodes are included in each data storage node cluster, and which graph data fragments are stored in each data storage node), a replica primary-secondary attribute of the data storage node (that is, a replica corresponding to the data storage node is a primary replica or a secondary replica), etc. FIG. 2 is an example schematic diagram illustrating replica topology information of graph data. In this specification, the replica topology information of the graph data can be represented by node metadata of each data storage node. Node metadata of each data storage node can include, for example, graph data fragment information stored in the data storage node, replica information corresponding to the data storage node, and primary-secondary attribute information of the data storage node. In addition, the node metadata of the data storage node can further include location information of the data storage node, for example, region information (for example, Beijing or Shanghai) or zone information (for example, North China and South China).

As shown in FIG. 2, when the graph data is stored in a distributed manner, the graph data is segmented to obtain a plurality of graph data fragments (for example, three graph data fragments), and then fragment data of one or more graph data fragments is stored on one data storage node in a primary replica node cluster in a hash manner, thereby completing a graph data write operation for the primary replica node cluster. Then, the graph data fragments are synchronized from the primary replica node cluster to a plurality of secondary replica node clusters, thereby completing distributed storage of the graph data.

In some embodiments, the node metadata can further include node status information of the data storage node. The node status information can include, for example, a rated storage capacity, an available storage capacity, a node working mode (readable/writable, unreadable/unwritable, etc.) of the data storage node, a progress activation status (an active state, an inactive state, etc.), and/or a node health status.

The graph data storage layer 130 is configured to implement distributed storage of graph data. The graph data storage layer 130 can include a primary replica node cluster and a plurality of secondary replica node clusters, and each replica node cluster is used to store one replica of the graph data. Each replica node cluster can include one or more data storage nodes, and each data storage node is configured to store some graph data fragments (for example, one or more graph data fragments) of the graph data. In this specification, the primary replica node cluster and the secondary replica node cluster can be collectively referred to as a data storage node cluster.

In some embodiments, the API interface layer 110 and/or the engine analysis layer 120 can be implemented by one or more node devices. At a time when the engine analysis layer 120 is implemented by a plurality of node devices, the node devices of the engine analysis layer 120 include a primary node device and a secondary node device. In this specification, an engine analysis layer and an engine analysis node cluster can be used interchangeably. The primary node device is responsible for interacting with the API interface layer 110 and the graph data storage layer 130 to respond to a request initiated by the API interface layer 110 or replica topology information reported by the graph data storage layer 130. The secondary node device is responsible for metadata synchronization and is always ready to campaign to become a primary node device. In some embodiments, the API interface layer 110 and the engine analysis layer 120 can be alternatively implemented by the same node device.

Each component at the API interface layer 110, the engine analysis layer 120, and the graph data storage layer 130 can communicate directly or through a network. In some embodiments, the network can be any one or more of a wired network or a wireless network. Examples of the network can include a cable network, a fiber-optic network, a telecommunication network, an enterprise internal network, the Internet, a local area network (LAN), a wide area network (WAN), a wireless local area network (WLAN), a metropolitan area network (MAN), a public switched telephone network (PSTN), a Bluetooth network, a ZigBee network, near field communication (NFC), an intra-device bus, an intra-device line, etc., or any combination thereof. In some embodiments, the API interface layer 110 and the engine analysis layer 120 can form a server-client (S/C) architecture with the graph data storage layer 130.

During a graph database service, graph metadata of the distributed graph database needs to be managed by an engine analysis service deployed at the engine analysis node cluster. Graph metadata managed by the engine analysis service includes version information of a data storage service supported by the distributed graph database and node metadata information at each data storage node. Generally, the distributed graph database supports many data storage service versions, and during actual deployment of the distributed graph database, the data storage node may implement only some data storage service versions. In this case, if the engine analysis service still maintains and manages all the data storage service versions supported by the distributed graph database, management load of the engine analysis service is large. Consequently, graph metadata management costs are increased, and graph metadata management efficiency is reduced.

To this end, embodiments of this specification provide graph metadata management solutions for a distributed graph database. According to the graph metadata management solutions, first, graph metadata at a time when no data storage service is provided is created based on data storage service version configuration data and data storage node cluster topology information that are obtained when a storage service is started in a debugging mode, and then the data storage service is started based on a normal mode to obtain node metadata of a data storage node at a time when the data storage service is provided, and the obtained node metadata is used to update a corresponding node metadata field of the created graph metadata, so that graph metadata managed by an engine analysis node cluster maintains only a data storage service version actually supported during current deployment of a distributed graph database, and does not need to maintain all data storage service versions that can be supported by the distributed graph. Thus, management load of an engine analysis service is reduced, and further, graph metadata management costs are reduced, and data management efficiency is improved.

Methods, apparatuses, and systems for managing graph metadata in a distributed graph database according to embodiments of this specification are described below with reference to the accompanying drawings.

FIG. 3 is an example diagram illustrating an architecture of a system 300 for managing graph metadata in a distributed graph database, according to embodiments of this specification. As shown in FIG. 3, the system 300 for managing graph metadata includes a graph database platform 310, an engine analysis node cluster 320, and a data storage node cluster 330. The graph database platform 310, the engine analysis node cluster 320, and the data storage node cluster 330 can communicate through a network 340. In some embodiments, the graph database platform 310, the engine analysis node cluster 320, and the data storage node cluster 330 can also communicate directly without the network 340.

The graph database platform 310 is configured to deploy a distributed graph database. During deployment of the distributed graph database, the graph database platform 310 first deploys an engine analysis layer, that is, how many engine analysis nodes are deployed to form the engine analysis node cluster to implement the engine analysis layer, and selects a specific engine analysis node in the engine analysis node cluster to serve as a primary engine analysis node. In some embodiments, the primary engine analysis node can be selected by an engine analysis node in the engine analysis node cluster based on a campaign mechanism. After the engine analysis layer is deployed, a data storage layer (that is, a data storage node cluster) is deployed, and the deployed data storage layer has data storage node cluster topology information, that is, the data storage layer includes how many data storage node clusters, and which data storage nodes maintain the same graph data replica together.

The data storage node cluster 330 is configured to store graph data, for example, store graph data fragment data. The engine analysis node cluster 320 implements graph metadata management of the distributed graph database in collaboration with the graph database platform 310 and the data storage node cluster 330.

FIG. 4 is an example flowchart illustrating a method for managing graph metadata in a distributed graph database, according to embodiments of this specification. The process shown in FIG. 4 is performed by an engine analysis node cluster.

As shown in FIG. 4, at 410, the engine analysis node cluster obtains storage service version configuration data at a time when a data storage service is started based on a debugging mode at a data storage node cluster. In some embodiments, the storage service version configuration data can include, for example, function description information or function list information of a function supported by a storage service version, for example, functions 1 to 5. In some embodiments, the storage service version configuration data can include, for example, storage service version information, for example, version 1.0, version 1.5, or version 2.0. However, detailed configuration information of the storage service version can be stored in a dedicated data storage device of a distributed graph database, for example, a version configuration information database.

After a graph database platform completes deployment of the distributed graph database, the graph database platform can deliver data storage node cluster topology information to the engine analysis node cluster. The engine analysis node cluster then starts an engine analysis service deployed at the engine analysis node cluster. In some embodiments, the engine analysis node cluster can start the engine analysis service under the control of the graph database platform. For example, after the graph database platform completes deployment of the distributed graph database, the graph database platform can send a graph database deployment completion notification to the engine analysis node cluster, and the graph database deployment completion notification can include the data storage node cluster topology information. In response to receiving the graph database deployment completion notification, the engine analysis node cluster starts the engine analysis service deployed at the engine analysis node cluster. In some embodiments, the engine analysis node cluster can start the engine analysis service in a manner of a container instance, that is, start an engine analysis service container.

After the engine analysis service at the engine analysis node cluster is started, the graph database platform starts the data storage service at the data storage node cluster based on the debugging mode. In the debugging mode, the data storage node cluster can work, but cannot provide the data storage service. In some embodiments, the graph database platform can start the data storage service in a manner of a container instance, that is, initiate a data storage service container. In some embodiments, the graph database platform can simultaneously start data storage services at data storage nodes in the data storage node cluster based on the debugging mode.

After the data storage node cluster starts the data storage service based on the debugging mode, the engine analysis node cluster can obtain, through the engine analysis service, the storage service version configuration data at a time when the data storage node cluster starts the data storage service based on the debugging mode. In some embodiments, the data storage node cluster can report the deployed storage service version configuration data to the engine analysis service at the engine analysis node cluster based on a heartbeat mechanism. In some embodiments, the graph database platform can obtain the storage service version configuration data deployed at the data storage node cluster, and send the obtained storage service version configuration data to the engine analysis service at the data storage node cluster.

In step 420, the engine analysis node cluster creates, based on the storage service version configuration data and the data storage node cluster topology information that is delivered by the graph database platform, graph metadata of the distributed graph database at a time when no data storage service is provided, where the created graph metadata can include a storage service version configuration field and a node metadata field of each data storage node, and the storage service version configuration field is populated with the storage service version configuration data.

For example, the engine analysis node cluster can create, according to a predetermined data structure based on the storage service version configuration data and the data storage node cluster topology information that is delivered by the graph database platform, the graph metadata (referred to as first graph metadata below) of the distributed graph database at a time when no data storage service is not provided. In the predetermined data structure, the graph metadata can be specified to include the storage service version configuration field and the node metadata field of each data storage node, and a field composition of the node metadata field is specified. In some embodiments, the node metadata field can include one or more of node identifier information, replica information corresponding to a node, primary-secondary attribute information of a replica corresponding to a node, graph data segment data information stored on a node, node status information, location information of a node, etc. In the first picture metadata, some or all node metadata fields can be empty fields, or can be populated with pre-configured invalid information.

FIG. 5 is an example schematic diagram illustrating graph metadata at a time when no data storage service is provided, according to embodiments of this specification. In the example of FIG. 5, the data storage node cluster includes three data storage nodes 1:10, 2:10, and 3:10, and the data storage nodes correspond to different replicas. A storage service version “geabase_version” of data storage node 1:10 and a storage service version “geabase_version” of 2:10 are “5.2.6-6405”, and a storage service version “geabase_version” of data storage node 3:10 is “5.2.6-6407”. The node metadata field includes a node identifier field “host”, a node status field “status”, a node primary-secondary attribute field “primary”, and a replica field “replica_id” corresponding to a node. The node identifier field “host” is populated with a node identifier and the node status field “status”. Field values of the node primary-secondary attribute field “primary” and the replica field “replica_id” corresponding to a node are null.

At 430, the engine analysis node cluster obtains node metadata information of the data storage node at a time when the data storage service is started at the data storage node cluster based on a normal mode.

After the first graph metadata is created, the graph database platform turns off a debugging-mode-based data storage service at the data storage node cluster. For example, the graph database platform can delete a started data storage service container. Then, the data storage service at the data storage node cluster is started based on the normal mode (for example, the data storage service container is started based on the normal mode), thereby providing a graph data service of the distributed graph database to the outside.

In this case, the engine analysis node cluster can obtain node metadata information of the data storage node at a time when the data storage service is started at the data storage node cluster based on the normal mode, for example, node status information, replica information corresponding to a node, and node primary-secondary attribute information.

For example, for data storage node 1:10, node status information is “GBS_ACTIVE”, that is, a process active state, replica information corresponding to the node is “1”, that is, data storage node 1:10 belongs to replica 1, and node primary-secondary attribute information is "true", that is, a replica corresponding to the node is a primary replica. For data storage node 2:10, node status information is "GBS-_ACTIVE", that is, a process active state, replica information corresponding to the node is "2", that is, data storage node 2:10 belongs to replica 2, and node primary-secondary attribute information is "false", that is, a replica corresponding to the node is a secondary replica. For data storage node 3:10, node status information is "GBS_ACTIVE", that is, a process active state, replica information corresponding to the node is "3", that is, data storage node 3:10 belongs to replica 3, and node primary-secondary attribute information is "false", that is, a replica corresponding to the node is a secondary replica.

In some embodiments, the node metadata information at a time when the data storage service is started based on the normal mode can be reported to the engine analysis node cluster through the data storage node cluster by using a heartbeat mechanism.

At 440, the engine analysis node cluster fills, through the engine analysis service, the obtained node metadata information of the data storage node into a corresponding node metadata field of the first graph metadata, to obtain managed graph metadata (referred to as second graph metadata below). FIG. 6 is an example schematic diagram illustrating graph metadata at a time when a storage service is provided, according to embodiments of this specification.

Figure 7:
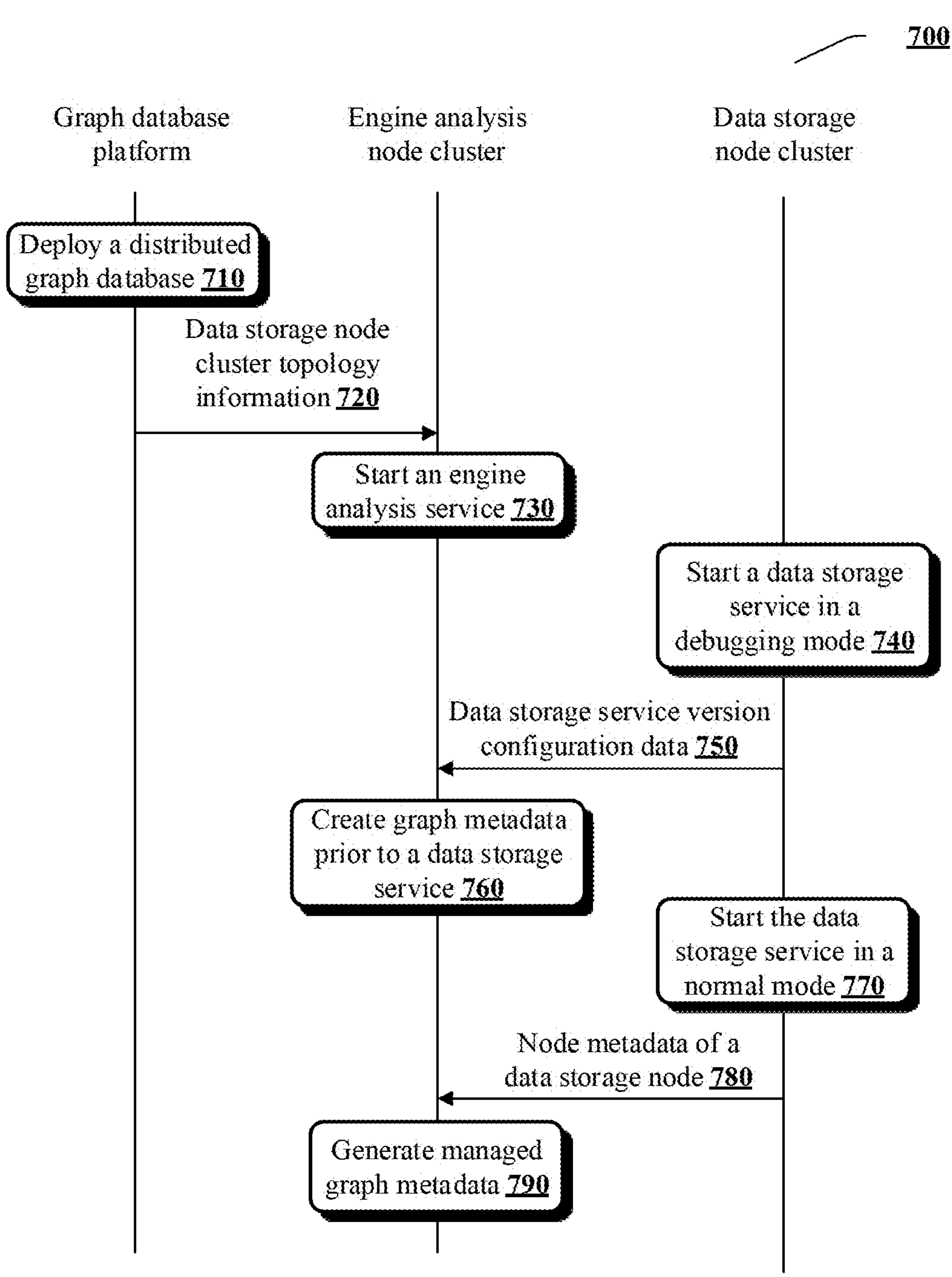
FIG. 7 is an example schematic diagram illustrating a process of managing graph metadata, according to embodiments of this specification.

FIG. 7 is an example schematic diagram illustrating a process 700 of managing graph metadata, according to embodiments of this specification. The process 700 of managing graph metadata is performed by components in a system for managing graph metadata collaboratively.

As shown in FIG. 7, at 710, a graph database platform deploys a distributed graph database. After the graph database platform completes deployment of the distributed graph database, at 720, the graph database platform delivers data storage node cluster topology information to an engine analysis node cluster.

At 730, a data storage node cluster starts an engine analysis service deployed at the engine analysis node cluster. At 740, a data storage service at the data storage node cluster is started in a debugging mode. For example, the data storage service at the data storage node cluster can be started based on the debugging mode through the graph database platform.

At 750, storage service version configuration data at a time when the data storage service is started at the data storage node cluster based on the debugging mode is obtained through the engine analysis service at the engine analysis node cluster. Then, at 760, first graph metadata is created through the engine analysis service based on the data storage node cluster topology information and the storage service version configuration data, where a storage service version configuration field in the first graph metadata is populated with the storage service version configuration data, and some or all node metadata fields are null fields or populated with invalid information.

At 770, the data storage service at the data storage node cluster is started based on a normal mode. For example, a debugging-mode-based data storage service at the data storage node cluster can be turned off through the graph database platform, and then the data storage service at the data storage node cluster is started based on the normal mode.

At 780, node metadata information of the data storage node at a time when the data storage service is started at the data storage node cluster based on the normal mode is obtained through the engine analysis service. For example, the data storage node cluster can report the node metadata information at a time when the data storage service is started based on the normal mode to the engine analysis node cluster by using a heartbeat mechanism.

At 790, the obtained node metadata information is filled into a corresponding node metadata field of the first graph metadata through the engine analysis service to obtain second graph metadata (that is, managed graph metadata).

The methods for managing graph metadata according to embodiments of this specification have been described above with reference to FIG. 1 to FIG. 7. According to the above-mentioned methods for managing graph metadata, data storage service version configuration data is obtained when a storage service is started in a debugging mode, and first graph metadata is created based on the storage service version configuration data and data storage node cluster topology information. Then, a corresponding node metadata field of the created graph metadata is updated by using obtained node metadata at a time when a data storage service is started based on a normal mode, so that graph metadata managed by an engine analysis node cluster can only maintain a data storage service version actually supported during current deployment of a distributed graph database, and does not need to maintain all data storage service versions that can be supported by the distributed graph database. Thus, management load of an engine analysis service is reduced, and further, graph metadata management costs are reduced, and graph metadata management efficiency is improved.

Figure 8:
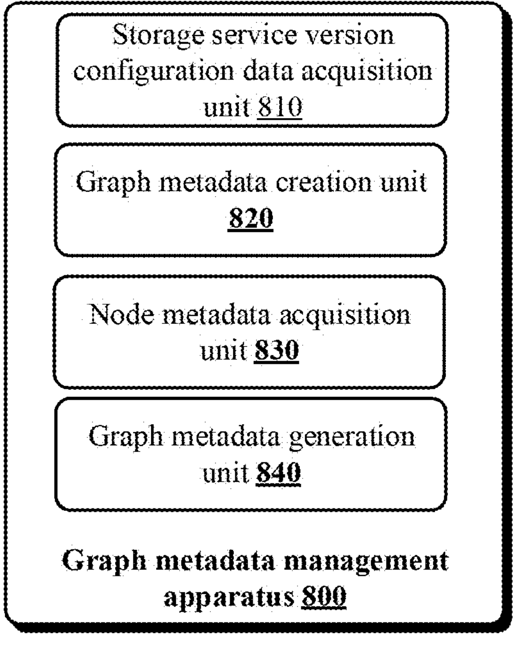
FIG. 8 is an example block diagram illustrating an apparatus for managing graph metadata in a distributed graph database, according to embodiments of this specification.

FIG. 8 is an example block diagram illustrating an apparatus 800 for managing graph metadata in a distributed graph database, according to embodiments of this specification. The apparatus 800 for managing graph metadata is applied to a data storage node cluster. As shown in FIG. 8, the apparatus 800 for managing graph metadata includes a storage service version configuration data acquisition unit 810, a graph metadata creation unit 820, a node metadata acquisition unit 830, and a graph metadata generation unit 840.

The storage service version configuration data acquisition unit 810 is configured to obtain storage service version configuration data at a time when a data storage service is started at a data storage node cluster based on a debugging mode. After the storage service version configuration data is obtained, the graph metadata creation unit 820 creates first graph metadata based on the storage service version configuration data and data storage node cluster topology information that is delivered by a graph database platform, where the first graph metadata includes a storage service version configuration field and a node metadata field of each data storage node, the storage service version configuration field is filled with the storage service version configuration data, and some or all node metadata fields are empty fields or populated with invalid information.

The node metadata information acquisition unit 830 obtains node metadata information of the data storage node at a time when the data storage service is started at the data storage node cluster based on a normal mode. Then, the graph metadata generation unit 840 fills the obtained node metadata information of the data storage node into a corresponding node metadata field of the first graph metadata to obtain second graph metadata, that is, managed graph metadata.

In some embodiments, the apparatus for managing graph metadata may further include an engine analysis service starting unit (not shown). After the graph database platform completes deployment of a distributed graph database and delivers the data storage node cluster topology information to an engine analysis node cluster, the engine analysis service starting unit can start an engine analysis service deployed at the engine analysis node cluster.

Methods, apparatuses, and systems for managing graph metadata in a distributed graph database according to embodiments of this specification are described above with reference to FIG. 1 to FIG. 8. The above-mentioned apparatus for managing graph metadata can be implemented by using hardware, or can be implemented by using software or a combination of hardware and software.

Figure 9:
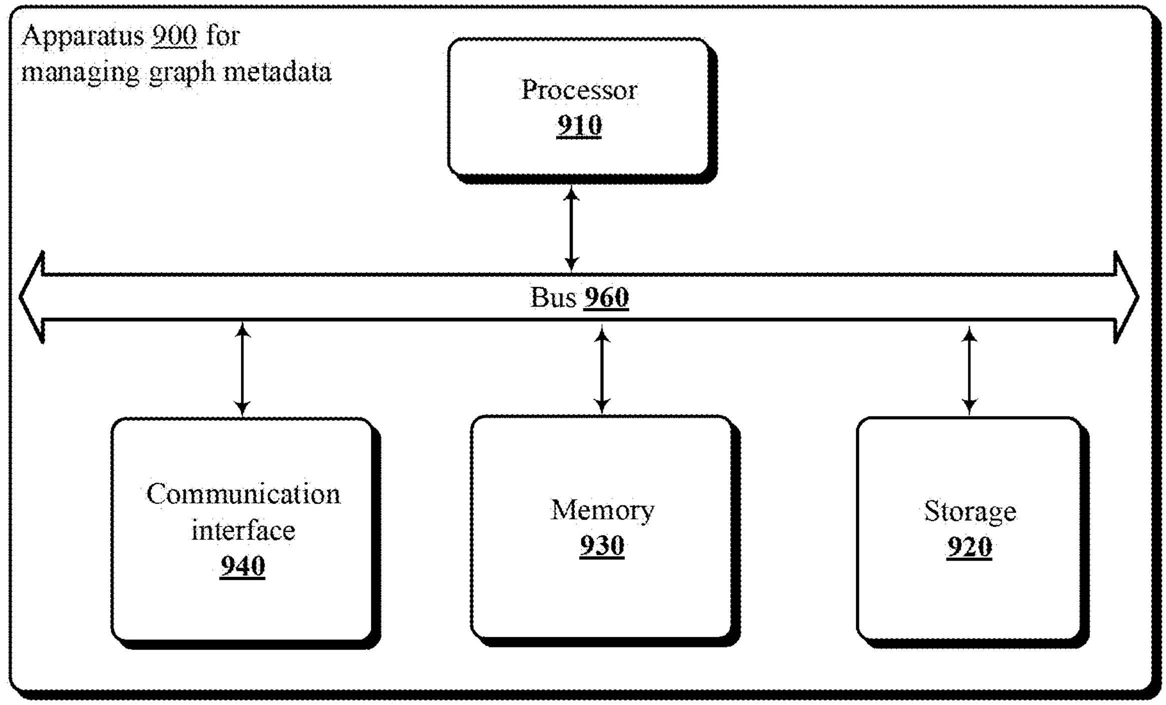
FIG. 9 is an example schematic diagram illustrating an apparatus for managing graph metadata in a distributed graph database implemented based on a computer system, according to embodiments of this specification.

FIG. 9 is an example schematic diagram illustrating an apparatus 900 for managing graph metadata in a distributed graph database implemented based on a computer system, according to embodiments of this specification. As shown in FIG. 9, the apparatus 900 for managing graph metadata can include at least one processor 910, a storage (for example, a nonvolatile memory) 920, a memory 930, and a communication interface 940, and the at least one processor 910, the storage 920, the memory 930, and the communication interface 940 are connected together through a bus 960. The at least one processor 910 executes at least one computer-readable instruction (to be specific, the above-mentioned element implemented in a software form) stored or encoded in the storage.

In an embodiment, a computer-executable instruction is stored in the storage, and when the instruction is executed, the at least one processor 910 is caused to perform the following: obtaining storage service version configuration data at a time when a data storage service is started at a data storage node cluster based on a debugging mode; creating, based on the storage service version configuration data and data storage node cluster topology information that is delivered by a graph database platform, graph metadata of the distributed graph database at a time when no data storage service is provided, where the graph metadata includes a storage service version configuration field and a node metadata field of each data storage node, and the storage service version configuration field is populated with the storage service version configuration data; obtaining node metadata information of the data storage node at a time when the data storage service is started at the data storage node cluster based on a normal mode; and filling the obtained node metadata information of the data storage node into a corresponding node metadata field of the graph metadata to obtain managed graph metadata.

It should be understood that when the computer-executable instruction stored in the storage is executed, the at least one processor 910 is enabled to perform the various operations and functions described above with reference to FIG. 1 to FIG. 8 in the embodiments of this specification.

According to an embodiment, a program product such as a machine-readable medium (for example, a non-transient machine-readable medium) is provided. The machine-readable medium can have instructions (to be specific, the above-mentioned element implemented in a software form). When the instruction is executed by a machine, the machine is enabled to perform the above-mentioned operations and functions described with reference to FIG. 1 to FIG. 10 in the embodiments of this specification. Specifically, a system or an apparatus equipped with a readable storage medium can be provided, and software program code for implementing the functions in any of the above-mentioned embodiments is stored in the readable storage medium, so that a computer or a processor of the system or the apparatus reads and executes the instructions stored in the readable storage medium.

In this case, the program code read from the readable medium can implement the functions in any one of some embodiments described above, and therefore the machine-readable code and the readable storage medium storing the machine-readable code form a part of this application.

Some embodiments of the readable storage medium include a floppy disk, a hard disk, a magneto-optical disk, an optical disc (for example, a CD-ROM, a CD-R, a CD-RW, a DVD-ROM, a DVD-RAM, a DVD-RW, and a DVD-RW), a magnetic tape, a nonvolatile memory card, and a ROM. Alternatively, the program code can be downloaded from a server computer or a cloud by a communication network.

According to one or more embodiments, a computer program product is provided. The computer program product includes a computer program, and when the computer program is executed by a processor, the processor is enabled to perform operations and functions described above with reference to FIG. 1 to FIG. 8 in embodiments of this specification.

A person skilled in the art should understand that various variations and modifications can be made to embodiments disclosed above without departing from the essence of this specification. Therefore, the protection scope of this specification should be defined by the appended claims.

It should be noted that, not all the steps and units in the above-mentioned processes and system structure diagrams are necessary, and some steps or units can be ignored based on an actual need. An execution sequence of the steps is not fixed, and can be determined as needed. The apparatus structure described in the above-mentioned embodiments can be a physical structure, or can be a logical structure. In other words, some units can be implemented by the same physical entity, or some units can be implemented by a plurality of physical entities or implemented jointly by some components in a plurality of independent devices.

In the above-mentioned embodiments, the hardware units or modules can be implemented by using a mechanical method or an electrical method. For example, a hardware unit, module, or processor can include a permanent dedicated circuit or logic (for example, a dedicated processor, an FPGA, or an ASIC) to complete corresponding operations. The hardware unit or processor can further include programmable logic or a programmable circuit (for example, a general-purpose processor or another programmable processor), so that software can perform temporary settings to complete corresponding operations. Specific implementations (mechanical methods, dedicated permanent circuits, or temporarily disposed circuits) can be determined based on cost and time considerations.

The specific implementations illustrated above with reference to the accompanying drawings describe example embodiments, but do not represent all embodiments that can be implemented or fall within the protection scope of the claims. The term "example" used throughout this specification means "used as an example, an instance, or an illustration", but does not mean "preferred" or "advantageous" over other embodiments. Specific implementations include specific details for the purpose of providing an understanding of the described technologies. However, these technologies can be implemented without these specific details. In some instances, to avoid obscuring the described concepts in the embodiments, well-known structures and apparatuses are shown in the form of a block diagram.

The above-mentioned descriptions of this disclosure are provided to enable any person of ordinary skill in the art to implement or use this disclosure. Various modifications made to this disclosure are apparent to a person of ordinary skill in the art, and the general principles defined in this specification can also be applied to other variants without departing from the protection scope of this disclosure. Therefore, this disclosure is not limited to the examples and designs described in this specification, but corresponds to the widest scope of principles and novel features disclosed in this specification.

What is claimed is:

1. A computer-implemented method for managing graph metadata in a distributed graph database, comprising:

obtaining storage service version configuration data at a time when a data storage node cluster starts a data storage service based on a debugging mode;

creating, based on the storage service version configuration data and data storage node cluster topology information that is delivered by a graph database platform, graph metadata of the distributed graph database at a time when no data storage service is provided, wherein the graph metadata comprises a storage service version configuration field and a node metadata field of each data storage node, and the storage service version configuration field is populated with the storage service version configuration data;

obtaining, as obtained node metadata information, node metadata information of the data storage node at a time when the data storage node cluster starts the data storage service based on a normal mode; and filling the obtained node metadata information of the data storage node into a corresponding node metadata field of the graph metadata to obtain managed graph metadata.

2. The computer-implemented method of claim 1, wherein the storage service version configuration data comprises storage service version information.

3. The computer-implemented method of claim 1, wherein the data storage service is started in a manner of a container instance.

4. The computer-implemented method of claim 1, wherein debugging-mode-based data storage services of data storage nodes in the data storage node cluster are started synchronously.

5. The computer-implemented method of claim 1, wherein normal-mode-based data storage services of the data storage node cluster are started after debugging-mode-based data storage services are turned off.

6. The computer-implemented method of claim 1, wherein the node metadata information at a time when the data storage service is started based on the normal mode is reported to an engine analysis node cluster through the data storage node cluster by using a heartbeat mechanism.

7. The computer-implemented method of claim 1, wherein the storage service version configuration data is obtained from the data storage node cluster through the graph database platform, and is then written into an engine analysis node cluster.

8. A non-transitory, computer-readable medium storing one or more instructions executable by a computer system to perform one or more operations for managing graph metadata in a distributed graph database, comprising:

obtaining storage service version configuration data at a time when a data storage node cluster starts a data storage service based on a debugging mode;

creating, based on the storage service version configuration data and data storage node cluster topology information that is delivered by a graph database platform, graph metadata of the distributed graph database at a time when no data storage service is provided, wherein the graph metadata comprises a storage service version configuration field and a node metadata field of each data storage node, and the storage service version configuration field is populated with the storage service version configuration data;

obtaining, as obtained node metadata information, node metadata information of the data storage node at a time when the data storage node cluster starts the data storage service based on a normal mode; and filling the obtained node metadata information of the data storage node into a corresponding node metadata field of the graph metadata to obtain managed graph metadata.

9. The non-transitory, computer-readable medium of claim 8, wherein the storage service version configuration data comprises storage service version information.

10. The non-transitory, computer-readable medium of claim 8, wherein the data storage service is started in a manner of a container instance.

11. The non-transitory, computer-readable medium of claim 8, wherein debugging-mode-based data storage services of data storage nodes in the data storage node cluster are started synchronously.

12. The non-transitory, computer-readable medium of claim 8, wherein normal-mode-based data storage services of the data storage node cluster are started after debugging-mode-based data storage services are turned off.

13. The non-transitory, computer-readable medium of claim 8, wherein the node metadata information at a time when the data storage service is started based on the normal mode is reported to an engine analysis node cluster through the data storage node cluster by using a heartbeat mechanism.

14. The non-transitory, computer-readable medium of claim 8, wherein the storage service version configuration data is obtained from the data storage node cluster through the graph database platform, and is then written into an engine analysis node cluster.

15. A computer-implemented system for managing graph metadata in a distributed graph database, comprising:

one or more computers; and one or more computer memory devices interoperably coupled with the one or more computers and having tangible, non-transitory, machine-readable media storing one or more instructions that, when executed by the one or more computers, perform one or more operations, comprising:

obtaining storage service version configuration data at a time when a data storage node cluster starts a data storage service based on a debugging mode;

creating, based on the storage service version configuration data and data storage node cluster topology information that is delivered by a graph database platform, graph metadata of the distributed graph database at a time when no data storage service is provided, wherein the graph metadata comprises a storage service version configuration field and a node metadata field of each data storage node, and the storage service version configuration field is populated with the storage service version configuration data;

obtaining, as obtained node metadata information, node metadata information of the data storage node at a time when the data storage node cluster starts the data storage service based on a normal mode; and filling the obtained node metadata information of the data storage node into a corresponding node metadata field of the graph metadata to obtain managed graph metadata.

16. The computer-implemented system of claim 15, wherein the storage service version configuration data comprises storage service version information.

17. The computer-implemented system of claim 15, wherein the data storage service is started in a manner of a container instance.

18. The computer-implemented system of claim 15, wherein debugging-mode-based data storage services of data storage nodes in the data storage node cluster are started synchronously.

19. The computer-implemented system of claim 15, wherein normal-mode-based data storage services of the data storage node cluster are started after debugging-mode-based data storage services are turned off.

20. The computer-implemented system of claim 15, wherein the node metadata information at a time when the data storage service is started based on the normal mode is reported to an engine analysis node cluster through the data storage node cluster by using a heartbeat mechanism.

* * * * *